(12) United States Patent
Piirainen et al.

(10) Patent No.: US 7,808,964 B2
(45) Date of Patent: Oct. 5, 2010

(54) MODIFIED DUAL SYMBOL RATE FOR UPLINK MOBILE COMMUNICATIONS

(75) Inventors: Olli Piirainen, Oulu (FI); Kari Niemela, Oulu (FI); Jari Hulkkonen, Oulu (FI); Mikko Saily, Sipoo (FI)

(73) Assignee: Nokia Corporation, Espoo (FI)

( * ) Notice: Subject to any disclaimer, the term of this patent is extended or adjusted under 35 U.S.C. 154(b) by 593 days.

(21) Appl. No.: 11/729,956

(22) Filed: Mar. 29, 2007

(65) Prior Publication Data

US 2007/0286300 A1    Dec. 13, 2007

Related U.S. Application Data

(60) Provisional application No. 60/793,427, filed on Apr. 19, 2006.

(51) Int. Cl.
*H04J 1/00* (2006.01)
*H04M 11/00* (2006.01)

(52) U.S. Cl. ............ 370/343; 370/342; 370/329; 455/403

(58) Field of Classification Search .......... 455/63, 455/73, 135, 522, 13, 69, 115, 450, 403; 370/335, 318, 330, 342, 320, 441, 347, 535, 370/329; 375/147, 141, 227, 146
See application file for complete search history.

(56) References Cited

U.S. PATENT DOCUMENTS

| | | | | |
|---|---|---|---|---|
| 7,593,481 | B2 * | 9/2009 | Feher | 375/299 |
| 2002/0176485 | A1 * | 11/2002 | Hudson | 375/144 |
| 2003/0081569 | A1 * | 5/2003 | Sexton et al. | 370/329 |
| 2003/0198305 | A1 * | 10/2003 | Taylor et al. | 375/341 |
| 2005/0083899 | A1 * | 4/2005 | Babbar et al. | 370/342 |
| 2005/0240399 | A1 * | 10/2005 | Makinen | 704/223 |
| 2006/0160553 | A1 | 7/2006 | Piirainen | |

OTHER PUBLICATIONS

DSR: 3GPP TSF GERAN #25, GP-051543, Jun. 20, 2005, Source: Nokia.
MDSR: 3GPP TSG GERAN #29, GP-060775, Apr. 24, 2006, Source: Nokia.
Huge WID: 3GPP TSG GERAN #31, GP-061739, Sep. 4, 2006, Source: Nokia, Ericsson.
Redhot WID: 3GPP TSG GERAN #32, GP-062488, Nov. 13, 2006, Source, Nokia, Ericsson.
3GPP TSG GERAN #24 TDpc GP-050910, Apr. 4-8, 2005, Source: Nokia.

(Continued)

*Primary Examiner*—Ajit Patel
*Assistant Examiner*—Mahendra Patel (57) ABSTRACT

The specification and drawings present a new method, system, apparatus and software product for using a new modified dual symbol rate (MDSR) in an uplink direction in mobile communication systems. The communication between the mobile station and the network element may be performed within evolved GSM/EDGE radio access networks. The MDSR can be for example one and a half times a symbol rate of an uplink speech service, e.g., the current GSM/EDGE symbol rate (13/48 MHz) in the mobile communication system, thus the MDSR may be substantially 13/32 MHz or about 405 kHz. The uplink signal with the MDSR may be modulated, e.g., using a quadrature amplitude modulation (QAM), e.g., 16-QAM with 16 states and/or a quadrature phase-shift keying (QPSK, or π/4-QPSK) modulation.

40 Claims, 4 Drawing Sheets

OTHER PUBLICATIONS

3GPP TR 45.912 v0.3.0 Feasibility study for evolved GSM/EDGE Radio Access Network (GERAN). Nov. 7, 2005 GP-052574 (original file corrupted, replaced Jan. 6, 2006).

Karlsson, J.; Heinegard, J., "Interference rejection combining for GSM, "Universal Personal Communications 1996, 1996 5th IEEE International Conference on, vol. 1, No., pp. 433-437 vol. 1, 29 Se-2 Oct. 1996. Abstract, Figure 1. Equation (3.7).

GP-052610, Agenda Item 7.1.5.5 "Updates for Dual Symbol Rate section of the Feasibility Study on Future GERAN Evolution" 3GPP TSG GERAN#27, Atlanta, USA, Nov. 7-11, 2005, 18 pages.

* cited by examiner

MODIFIED DUAL SYMBOL RATE FOR UPLINK MOBILE COMMUNICATIONS

CROSS-REFERENCE TO RELATED APPLICATION

This application claims priority from U.S. Patent Application Ser. No. 60/793,427, filed on Apr. 19, 2006.

TECHNICAL FIELD

This invention generally relates to mobile communications and more specifically to a new modified dual symbol rate (MDSR) for uplink in mobile communication systems.

BACKGROUND ART

Figure 1:
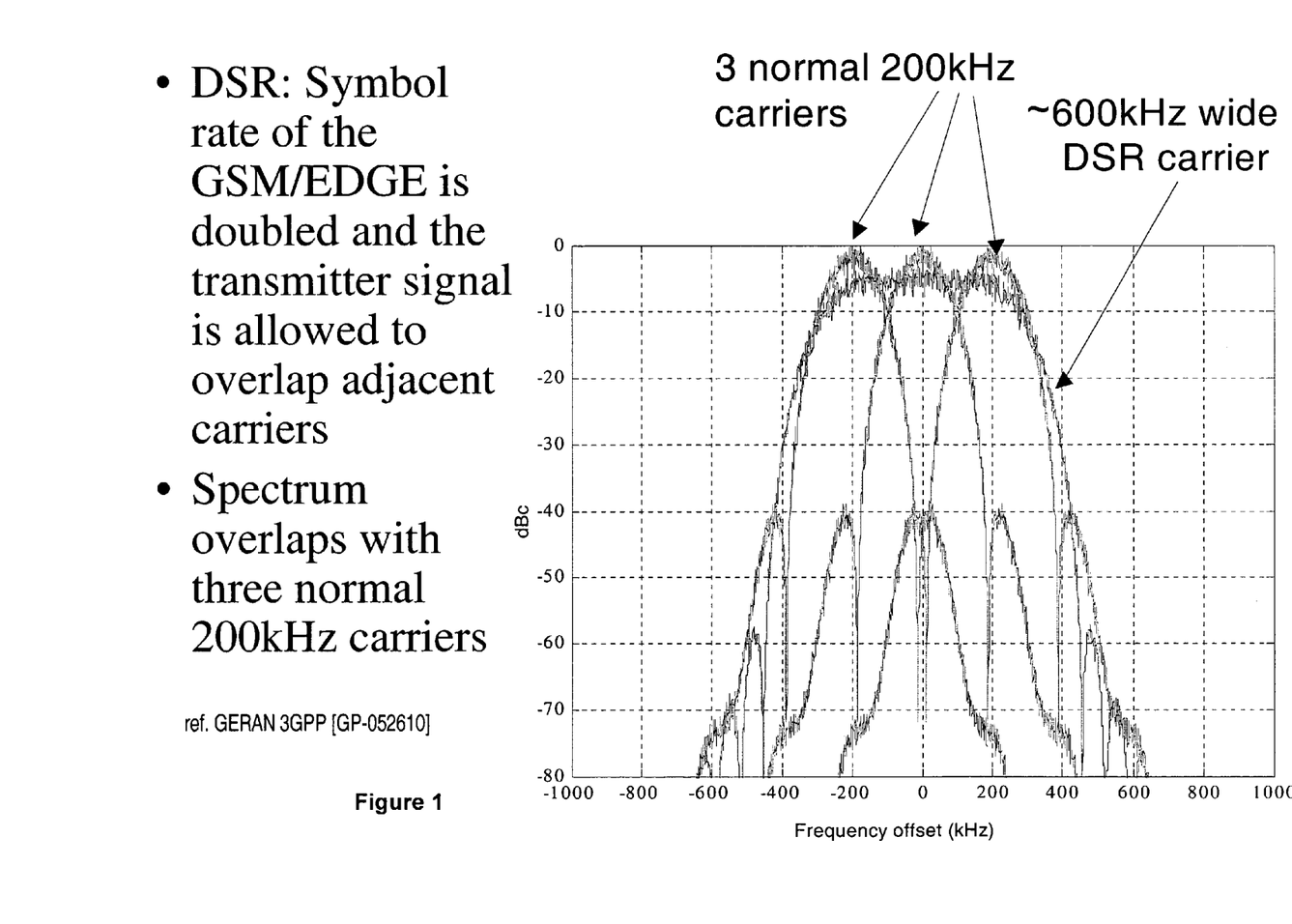
FIG. 1 is a schematic representation of a spectrum of dual symbol rate (DSR)

EDGE (enhanced data rates for global evolution) further evolution candidates have been presented in GERAN (GSM (global system for mobile communications)/EDGE radio access network) 3GPP (3d generation partnership project). Dual Symbol Rate (DSR) for uplink performance improvement is proposed. As shown in 3GPP contributions, e.g., in GP-052610, Agenda Item 7.1.5.5, "Updates for Dual Symbol Rate Section of the Feasibility Study on Future GERAN Evolution", 3GPP TSG GERAN#27, Atlanta, USA. In the DSR, the symbol rate of the GSM/EDGE is doubled and the transmitter signal is allowed to overlap adjacent carriers. The DSR nearly doubles UL (uplink) data spectral efficiency and is, therefore, the interesting UL capacity enhancement feature for the EDGE evolution. From the system performance point of view, frequency planning needs to be considered carefully because adjacent DSR carriers are partially overlapping, which "brakes" the basic frequency planning that is made for the normal 200 kHz carriers because the DSR carriers have a spectrum of approximately 600 kHz wide compared to the normal 200 kHz wide carriers as shown in FIG. 1. In the DSR concept the symbol rate was doubled, thus doubling the bit rate over the air interface can be obtained with the same modulation. This makes it possible to use the current EGPRS (enhanced general packet radio service) coding schemes for the DSR, only transmit them with the double bit rate. Thus, the original EGPRS link adaptation and incremental redundancy are compatible with the DSR.

Also in the case of EGPRS, interference conditions need to be considered when data connections are allocated to the hopping layer. Data connections are typically causing more interference than speech connections (e.g., because data uses higher transmitter powers since C/I (carrier-to-interference ratio) and the target is higher compared to AMR/FS (adaptive multi-rate full rate speech).

As shown in FIG. 1, the DSR carrier overlaps with adjacent carriers so that the interference situation is worse in the network using DSR; then the original frequency reuse is blurred in the DSR case. As adjacent DSR carriers are overlapping, usage of DSR makes the interference situation uncontrolled when basic frequency planning is used.

Moreover, in the case of the EGPRS, increased interference from data connections can be a problem, data traffic is allocated to hopping layer which was originally planned for the speech traffic only. Increased interference decreases speech traffic performance.

In the GSM system, co-channel and adjacent channel interference is controlled with the frequency planning. Data and speech traffic can be separated for different frequencies so that speech and data are not interfering with each other. Data traffic can be allocated to BCCH (broadcast control channel) frequencies as far as there are enough resources in a BCCH TRX (transceiver). But, when the BCCH TRX capacity is not enough for the data transmission, a certain amount of hopping layer resources need to be reserved for data. In that case, speech and data connections are interfering with each other. The EGPRS power control is one way to control the interference caused by the data traffic, but then the trade-off between the data throughput and the speech quality is made.

For the DSR concept proposed for the EDGE evolution in 3GPP there are no specific solutions available to control interference caused by wider DSR carriers. As stated in the DSR feasibility study (see GP-052610 quoted above), the current solution is to use IRC (interference rejection combining) receivers and try to cope with increased interference in the network. Also, advanced channel allocation methods which allocate channels based on interference conditions could be used, like proposed in the invention "Radio channel allocation and link adaptation in cellular telecommunication system" by Jari Hulkkonen and Olli Piirainen, filed as a Finnish patent application No. 20055687 on Dec. 21, 2005, but those require more complex allocation algorithms, interference evaluation, etc.

Furthermore, the DSR requires a large bandwidth (3 dB bandwidth is 541 kHz) from the BTS receiver and it seems to cause some possible problems in some infra vendors (i.e., other BTS manufacturers), e.g., with a frequency step size of frequency synthesizers, sample rate for analog-to-digital converters and/or analog filtering. (It should be noted that the evolution items should preferably include only software changes) in the infra side.

Currently, the activity for developing continuation for the existing EDGE standard, which are agreed upon, include mainly downlink improvements (such as spatial diversity and dual carrier). In order to really be able to improve the coverage of the system and improve the data rates, the uplink should be considered more carefully. Current GSM/EDGE algorithm developments contain high performance IRC algorithms and the impacts of interference to radio link performance can be effectively mitigated. Still, in the existing GSM/EDGE networks the capabilities of IRC algorithms have not been fully utilized.

DISCLOSURE OF THE INVENTION

According to a first aspect of the invention, a method, comprises: defining by a mobile station in a service based mobile communication system an uplink signal having a modified dual symbol rate, wherein the modified dual symbol rate differs from a dual symbol rate of 13/24 MHz (i.e., 13 MHz divided by 24 gives a symbol rate of 541,666.7 symbols per second) and exceeds by a predetermined amount a symbol rate of an uplink speech service in the mobile communication system; and sending the uplink signal by the mobile station to a network element.

According further to the first aspect of the invention, the uplink signal may be modulated using at least one of: a quadrature amplitude modulation, and a quadrature phase-shift keying modulation. Further, the quadrature amplitude modulation may have 16 states. Still further, the uplink signal may be modulated with the quadrature amplitude modulation having a bit rate substantially equal to two times of a bit rate of the uplink speech service. Yet still further, the uplink signal may be modulated with the quadrature phase-shift keying modulation having a bit rate substantially equal to a bit rate of the uplink speech service. Yet further still, the signal may be modulated using both the quadrature amplitude modulation and the quadrature phase-shift keying modulation.

Further according to the first aspect of the invention, the uplink signal may have a modified dual symbol rate of 13/32 MHz (i.e., 406,250 symbols per second) with the bandwidth at half power substantially equals 405 kHz.

Still further according to the first aspect of the invention, the uplink signal having the modified dual symbol rate may be for a data service.

According yet further to the first aspect of the invention, the uplink signal having the modified dual symbol rate may be only for a packet switched service.

According still further to the first aspect of the invention, the uplink signal having the modified dual symbol rate may be for both a circuit switched speech service and for a packet switched data service.

According further still to the first aspect of the invention, the communication between the mobile station and the network element may be performed within an evolved global system for mobile communications/enhanced data rates for global evolution radio access network.

According yet further still to the first aspect of the invention, the network element may be a base transceiver station.

Yet still further according to the first aspect of the invention, the uplink signal may have a modified dual symbol rate of 13/40 MHz (i.e., 325,000 symbols per second) with the bandwidth at half power substantially equals 325 kHz.

Still yet further according to the first aspect of the invention, the method may further comprise: receiving by the mobile station a downlink signal with a modified symbol rate, wherein the modified symbol rate exceeds by a further predetermined amount the symbol rate of the uplink speech service in the mobile communication system.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of the mobile station.

According to a third aspect of the invention, a mobile station of a mobile communication system, comprises: an uplink signal generating module configured to generate an uplink signal having a modified dual symbol rate, wherein the modified dual symbol rate differs from a dual symbol rate of 13/24 MHz and exceeds by a predetermined amount a symbol rate of an uplink speech service in the mobile communication system; and a module configured to transmit the uplink signal to a network element.

Still yet further according to the first aspect of the invention, the uplink signal may be modulated using at least one of: a quadrature amplitude modulation, and a quadrature phase-shift keying modulation. Further, the quadrature amplitude modulation may have 16 states. Still further, the uplink signal may be modulated with the quadrature amplitude modulation having a bit rate substantially equal to two times of a bit rate of the uplink speech service. Yet still further, the uplink signal may be modulated with the quadrature phase-shift keying modulation having a bit rate substantially equal to a bit rate of the uplink speech service. Yet further still, the signal may be modulated using both the quadrature amplitude modulation and the quadrature phase-shift keying modulation.

Further according to the third aspect of the invention, the uplink signal may have a modified dual symbol rate of 13/32 MHz with the bandwidth at half power substantially equals 405 kHz.

Still further according to the third aspect of the invention, the uplink signal having the modified dual symbol rate may be for a data service.

According yet further to the third aspect of the invention, the uplink signal having the modified dual symbol rate may be only for a packet switched service.

According still further to the third aspect of the invention, the uplink signal having the modified dual symbol rate may be for both a circuit switched speech service and for a packet switched data service.

According yet further still to the third aspect of the invention, the communication between the mobile station and the network element may be performed within an evolved global system for mobile communications/enhances data rates for global evolution radio access network.

According further still to the third aspect of the invention, the uplink signal may have a modified dual symbol rate of 13/40 MHz with the bandwidth at half power substantially equals 325 KHz.

Still further still according to the third aspect of the invention, the module or a separate receiver comprised in the mobile station may be further configured to receive a downlink signal with a modified symbol rate, wherein the modified symbol rate exceeds by a further predetermined amount the symbol rate of the uplink speech service in the mobile communication system.

According to a fourth aspect of the invention, a mobile communication system, comprises: a mobile station configured to provide an uplink signal having a modified dual symbol rate, wherein the modified dual symbol rate differs from a dual symbol rate of 13/24 MHz and exceeds by a predetermined amount a symbol rate of an uplink speech service in the mobile communication system; and a network element configured to receive the uplink signal.

According further to the fourth aspect of the invention, the uplink signal may be modulated using at least one of: a quadrature amplitude modulation, and a quadrature phase-shift keying modulation.

Further according to the fourth aspect of the invention, the mobile station may be a wireless communication device, a portable device, a mobile communication device, a mobile phone or a mobile camera phone.

According to a fifth aspect of the invention, a mobile communication system, comprises: a receiver, configured to receive an uplink signal having a modified dual symbol rate, wherein the modified dual symbol rate differs from a dual symbol rate of 13/24 MHz and exceeds by a predetermined amount a symbol rate of an uplink speech service in the mobile communication system; and a processing/re-transmitting module configured to transmit the uplink signal further uplink to a further network element.

According further to the fifth aspect of the invention, the uplink signal may be modulated using at least one of: a quadrature amplitude modulation, and a quadrature phase-shift keying modulation.

Further according to the fifth aspect of the invention, the network element may further comprise: an MDSR scheduling module configured to provide an instruction signal to a mobile station for reducing interference in the uplink signal having the modified dual symbol rate.

Still further according to the fifth aspect of the invention, the network element may further comprise: a transmitter configured to transmit a downlink signal with a modified symbol rate, wherein the modified symbol rate exceeds by a further predetermined amount the symbol rate of the uplink speech service in the mobile communication system.

According still further to the fifth aspect of the invention, the downlink signal may have a modified symbol rate of 13/40 MHz with the bandwidth at half power substantially equals 325 kHz.

According to a sixth aspect of the invention, the method may further comprise: receiving by a network element of a mobile communication system an uplink signal having a modified dual symbol rate, wherein the modified dual symbol rate differs from a dual symbol rate of 13/24 MHz and exceeds by a predetermined amount a symbol rate of an uplink speech service in the mobile communication system; and re-transmitting by the network element the uplink signal further uplink to a further network element.

According further to the sixth aspect of the invention, the uplink signal may be modulated using at least one of: a quadrature amplitude modulation, and a quadrature phase-shift keying modulation.

Further according to the sixth aspect of the invention, the method may further comprise: providing an instruction signal by the network element to a mobile station for reducing interference in the uplink signal provided by the mobile station.

According to a seventh aspect of the invention, a computer program product comprising: a computer readable storage structure embodying computer program code thereon for execution by a computer processor with the computer program code, wherein the computer program code comprises instructions for performing the sixth aspect of the invention, indicated as being performed by any component or a combination of components of the network

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new method, system, apparatus and software product are presented for using a new modified dual symbol rate (MDSR) in an uplink direction (from a mobile station to a network element) in mobile communication systems. The communication between the mobile station and the network element may be performed within evolved global system for mobile communications/enhanced data rates for global evolution (GSM/EDGE) radio access networks. The network element may be, e.g., a base transceiver station (BTS). The mobile station may be (but is not limited to): a mobile phone, a wireless device, a mobile camera phone, etc.

According to an embodiment of the present invention, the modified dual symbol rate may be for example one and a half times a symbol rate of an uplink speech service, e.g., the current GSM/EDGE symbol rate of 270,833.3 symbols per second (13/48 MHz) with the bandwidth at half power substantially equals 180 kHz in the mobile communication system, thus the modified dual symbol rate can be substantially 13/32 MHz with a −3 dB (half power) bandwidth of about 405 kHz. Also the modified dual symbol rate may have other values exceeding by a predetermined amount the symbol rate of the uplink speech service, for example the modified dual symbol rate may have a symbol rate of 13/40 MHz with the bandwidth at half power substantially equals 325 kHz, etc. In addition to using the modified dual symbol rate in the uplink, the modified symbol rate can be also used in the downlink, wherein the modified symbol rate can exceed by a further predetermined amount said symbol rate of the uplink speech service in the mobile communication system. For example the modified symbol rate can be 13/40 MHz with the bandwidth at half power substantially equals 325 kHz in the downlink.

According to a further embodiment of the present invention, an uplink signal with the MDSR may be modulated using a quadrature amplitude modulation (QAM), e.g., 16-QAM with 16 states and/or optionally a quadrature phase-shift keying (QPSK, or π/4-QPSK) modulation. Moreover, other types of modulation, e.g., 32-QAM with 32 states, can be used as well.

Moreover, the uplink signal utilizing the MDSR may be modulated using the quadrature amplitude modulation (e.g., 16-QAM) having a bit rate substantially equal to two times of a bit rate of the uplink EGPRS service, i.e., having the same bit rate as provided in case of the DSR. Furthermore, the uplink signal utilizing the MDSR may be modulated using the quadrature phase-shift keying (QPSK) modulation having a bit rate substantially equal to the bit rate of the uplink speech service.

The uplink signal having the modified dual symbol rate may be used for a packet switched (PS) service and the speech transmission may be implemented, e.g., by a circuit switch (CS) service using the GSM (global system for mobile communications) service.

The uplink signal having the modified dual symbol rate may be used for the data transmission service (e.g., the PS service) or for both the data transmission service and speech (e.g., the CS service) transmission services.

It is noted that MDSR using 3/2 symbol rate, 16-QAM (and/or QPSK) and the EGPRS coding schemes are for a "tight package". With this setup, someone can use the current EGPRS coding schemes, thus providing simple link adaptation and incremental redundancy with the current EGPRS. These services can be summarized as follows:

in EQPRS, 8-PSK (phase-shift keying) is used: 3 bits/symbol*1× symbol rate=3 bits/original symbol period;

in DSR, 8-PSK is used, but with 2× symbol rate: 3 bits//symbol*2× symbol rate=6 bits/original symbol period; and in MDSR, there is 16-QAM (or QPSK) with 3/2× symbol rate: 4 bits/symbol* 3/2 symbol rate=6 bits/original symbol period (or 2bts/symbol*3/2× symbol rate=3 bits/original symbol period). Thus, in a single timeslot with MDSR, there is 2× (1× with QPSK) more bits than in the original EGPRS, which makes it easy to use the original coding schemes. The selection of the symbol rate and modulation for the MDSR are necessitated by a need to reuse original coding schemes.

Table 1 present comparison of approximated parameters for examples of MDSR, DSR and EDGE (or equivalently EGPRS) signals. CCI level, ACI1 level and ACI2 level are co-channel interference, $1^{st}$ adjacent channel interference and $2^{nd}$ adjacent channel interference, respectively.

TABLE 1

|  | EDGE | DSR | MDSR |
| --- | --- | --- | --- |
| Symbol rate | 13/48 MHz | 13/24 MHz | 13/32 MHz |
| Burst length | 156.25 symbols | 312.5 symbols | 234.375 symbols |
| Modulation shaping | 8PSK Linearized Gaussian | 8PSK Root raised cosine (0.3) | 16-QAM + π/4-QPSK Root raised cosine (0.3) |
| 3 dB bandwidth | 180 kHz | 541 kHz | 405 kHz |
| Peak bit rate | 59.2 kbps | 118.2 kbps | 118.2 kbps |
| CCI level | 0 dB | −5 dB | −3 dB |
| ACI1 level | −18 dB | −6 dB | −7 dB |
| ACI2 level | −47 dB | −21 dB | −36 dB |

Figure 2:
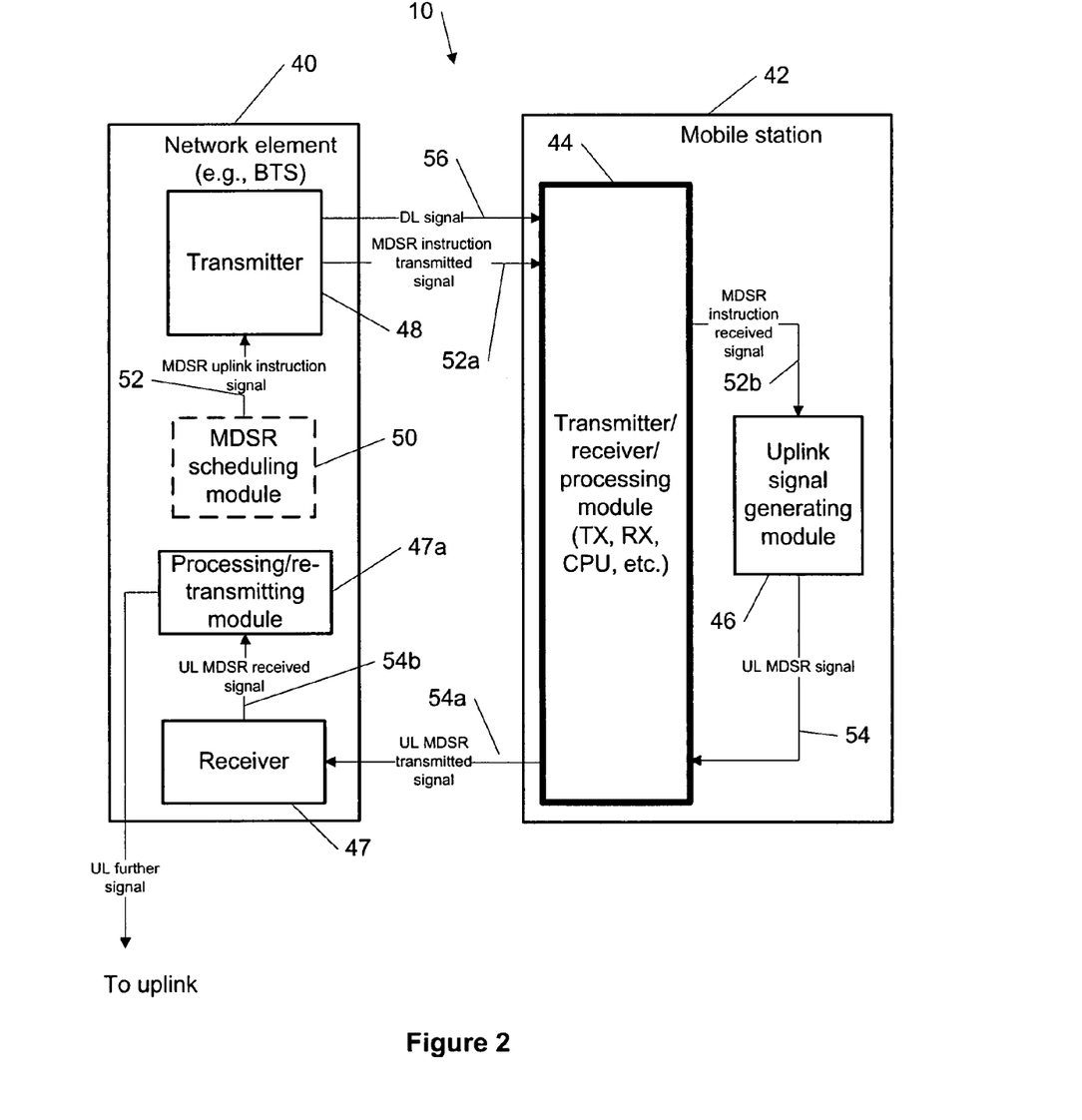
FIG. 2 is a block diagram of a mobile communication system with a modified dual symbol rate (MDSR) for uplink communications, according to an embodiment of the present invention.

The proposed new MDSR has narrower bandwidth (BW) compared to the original DSR. Thus the MDSR may fit better to infra vendors implementations. It is further noted that in order to enable a software (SW) update in the network element (e.g., in the BTS), the used receiver may be (but is not limited to) a frequency domain MMSE (minimum mean square estimator) or FD (frequency domain)-MMSE, also sometimes called frequency domain equalizer. This receiver algorithm is rather simple and according to estimated complexity, it can enable SW only implementation already in the existing products. FIG. 2 shows an example among others of a block diagram of a mobile communication system 10 with a modified dual symbol rate (MDSR) for uplink communications, according to an embodiment of the present invention.

In the example of FIG. 2, the mobile station (or user equipment) 42 comprises an uplink signal generating module 46 and a transmitter/receiver/processing module 44. In the context of the present invention, the mobile station 42 can be a wireless communication device, a portable device, a mobile communication device, a mobile phone, a mobile camera phone, etc. In the example of FIG. 2, a network element 40 (e.g., a BTS or a Node B) can comprise a transmitter 48, a receiver 47, a processing/re-transmitting module 47a (the module 47a can be combined with the module 47), and optionally an MDSR scheduling module 50. It is noted that the module 46 can generally be signal generation means or a structural equivalence (or equivalent structure) thereof. Also, the module 44 can generally be transmitting and/or receiving means, e.g., a transceiver, or a structural equivalence (or equivalent structure) thereof. Moreover, the receiver 47 can generally be means for receiving the uplink signal, e.g., a transceiver, or a structural equivalence (or equivalent structure) thereof. Furthermore, the processing/re-transmitting module 47a can generally be means for re-transmitting the uplink signal, e.g., a transceiver, or a structural equivalence (or equivalent structure) thereof. Also, the MDSR scheduling module 50 can generally be means for providing the instruction signal, or a structural equivalence (or equivalent structure) thereof.

According to an embodiment of the present invention, the network, e.g., the MDSR scheduling module 50, may optionally provide an MDSR uplink instruction signal (i.e., signal 52) for generating the uplink signal utilizing MDSR described herein. For example, the signal 52 may comprise information about (but not limited to) frequency and timeslot reuse, power control and carrier frequency shifting for controlling interference in the uplink signal with MDSR. The instructions contained in the signal 52 are forwarded (signal 52a) to the module 44 of the mobile station 42 and then further forwarded (signal 52b) to the module 46. The module 46 can use the uplink reuse instructions contained in the signal 52b for generating an UL signal 54 (e.g., comprising data and/or voice information) which is forwarded by the module 44 (signal 54a) to the receiver 47 of the network element 40 which is then processed by the processing/re-transmitting module 47a and forwarded further in the uplink direction to a further network element (e.g., base station controller).

It is further noted that in addition to using the modified dual symbol rate in the uplink, a modified symbol rate can be also used in the downlink, e.g., for transmitting a downlink (DL) signal 56, wherein the modified symbol rate can exceed by a further predetermined amount the symbol rate of the uplink speech service in the mobile communication system (for example the modified symbol rate can be 13/40 MHz with the bandwidth at half power substantially equals 325 kHz as described above).

According to an embodiment of the present invention, the module 44, 46, 47, 47a or 50 can be implemented as a software block, a hardware module/block or a combination thereof. Furthermore, each of the modules 44, 46, 47, 47a or 50 can be implemented as a separate module or can be combined with any other standard module/block of the mobile station 42 or the network element 40, or it can be split into several blocks according to their functionality. The transmitter/receiver/processing block 44 can be implemented in a plurality of ways and typically can include a transmitter, a receiver, a CPU (central processing unit), etc. The transmitter and receiver can be combined, for example, in one module such as transceiver, as known in the art. The module 44 provides an effective communication of the module 46 with the network element 40.

Figure 3:
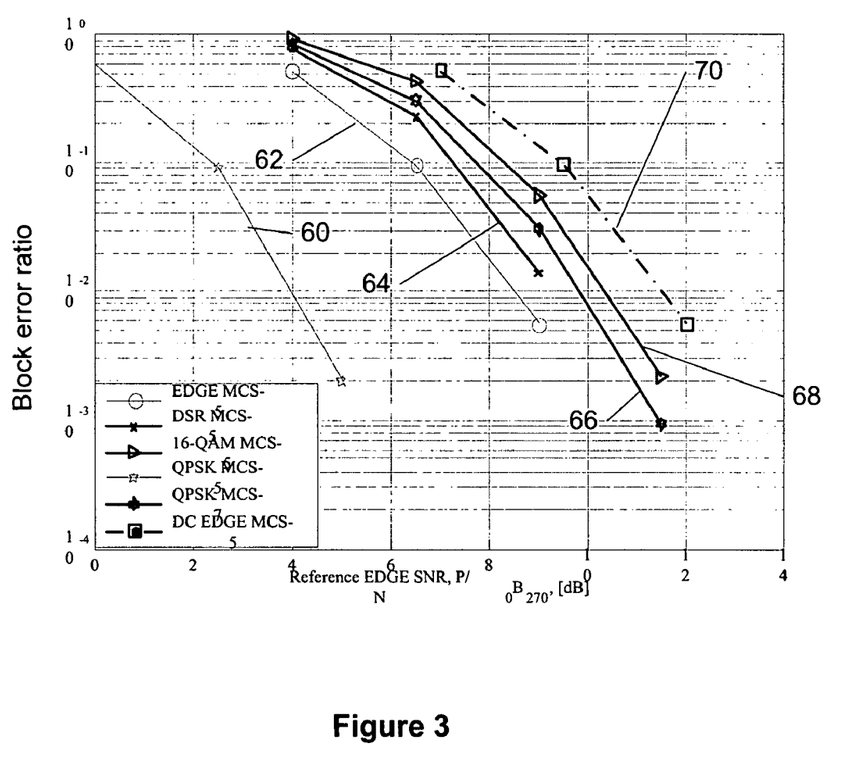
FIG. 3 is a graph demonstrating block error rate performance of a modified dual symbol rate (MDSR) in comparison with other methods, according to an embodiment of the present invention.

FIG. 3 is an example among others of a graph demonstrating block error rate performance of an evolved DSR in comparison with other methods, according to an embodiment of the present invention.

The horizontal scale defines the SNR in a way that the noise power is calculated over 270 kHz bandwidth, regardless of the signal bandwidth: this way we get comparable block error rate curves with the same TX (transmitter) power. MCS-5 and MCS-7 are the names of two EGPRS coding schemes which already exist in standards. DC EDGE refers to a Dual carrier EDGE. Basically, it is the EGPRS result shifted by 3 dB, because in dual carrier each carrier must reduce the TX power to half in order to keep the total TX power the same. Curve 62 represents EGPRS results.

The DSR (curve 64) with a doubled original data rate has approximately 1 dB difference with the EGPRS (curve 62). The curves with MDSR (symbol rate of 13/24 MHz) have slightly worse performance: a) curve 66 (16-QAM MCS-5) seems to lose approximately 1 dB compared to the DSR (curve 64), but 1 dB ahead of a dual carrier (curve 70); b) curve 68 (QPSK MCS-7) has the same data rate as curve 66 but 0.5 dB better performance 0than the curve 66; c) curve 60 (QPSK MCS-5) has 4 dB better performance than the curve 70. Curve 62 is the reference EGPRS for MCS-5 and it has two times lower data rate compared to all other curves, except the curve 60 (which has the same rate, but better performance).

Figure 4:
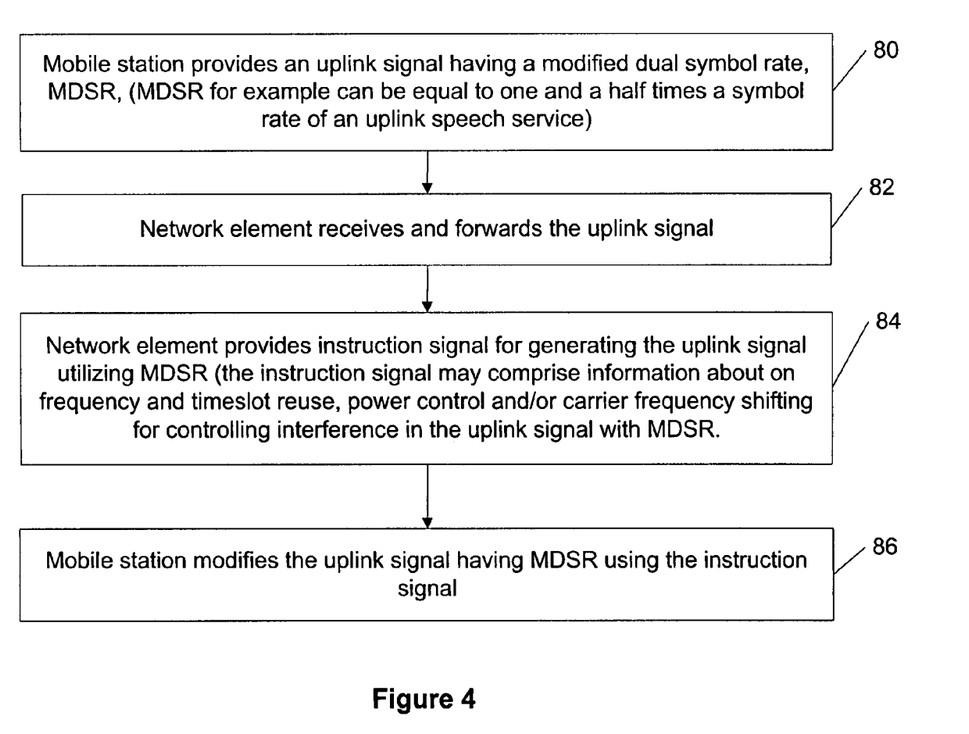
FIG. 4 is a flow chart demonstrating performance of a mobile communication system with a modified dual symbol rate (MDSR) for uplink communications, according to an embodiment of the present invention.

FIG. 4 is a flow chart demonstrating performance of a mobile communication system with a modified dual symbol rate (MDSR) for uplink communications, according to an embodiment of the present invention;

The flow chart of FIG. 4 only represents one possible scenario among others. The order of steps shown in FIG. 4 is not absolutely required, so generally, the various steps can be performed out of order. In a method according to an embodiment of the present invention, in a first step 80, the mobile station provides an uplink signal having a modified dual symbol rate (MDSR) which, e.g., can be one and a half times a symbol rate of an uplink speech service, according to the embodiments described herein. In a next step 82, the network element receives and forwards the uplink signal in the uplink to a further network element.

In a next step 84, the network element can provide an instruction signal for generating the uplink signal utilizing MDSR, wherein the instruction signal may comprise information about frequency and timeslot reuse, power control and/or carrier frequency shifting for controlling interference in the uplink signal with MDSR. In a next step 86, the mobile station modifies the uplink signal having MDSR using the instruction signal.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   defining by a mobile station in a service based mobile communication system an uplink signal having a symbol rate according to a modified dual symbol rate standard, wherein the symbol rate according to the modified dual symbol rate standard is smaller than a symbol rate according to a dual symbol rate standard of 541,666.7 symbols per second for providing a smaller bandwidth than when using said dual symbol rate standard, and exceeds by a predetermined amount a symbol rate according to a symbol rate standard of an uplink speech service of 270,833.3 symbols per second in said mobile communication system for providing the same as or a higher number of bits per an original symbol period than said uplink speech service; and
   sending said uplink signal by said mobile station to a network element, wherein said uplink signal has a symbol rate according to said modified dual symbol rate of 325,000 symbols per second wherein said bandwidth at half power substantially equals 325 kHz.

2. The method of claim 1, wherein instead of octonary phase shift keying as used for modulation of said uplink signal according to both said uplink speech service and to said dual symbol rate standard, said uplink signal is modulated using at least one of:
   a quadrature amplitude modulation, and
   a quadrature phase-shift keying modulation.

3. The method of claim 2, wherein said quadrature amplitude modulation has 16 states.

4. The method of claim 2, wherein said uplink signal is modulated with the quadrature amplitude modulation having a bit rate substantially equal to two times of a bit rate of the uplink speech service.

5. The method of claim 2, wherein said uplink signal is modulated with the quadrature phase-shift keying modulation having a bit rate substantially equal to a bit rate of the uplink speech service.

6. The method of claim 2, wherein said signal is modulated using both the quadrature amplitude modulation and the quadrature phase-shift keying modulation.

7. The method of claim 1, wherein said uplink signal has a symbol rate according to said modified dual symbol rate standard of 406,250 symbols per second wherein said bandwidth at half power substantially equals 405 kHz.

8. The method of claim 1, wherein the uplink signal having the modified dual symbol rate is for a data service.

9. The method of claim 1, wherein the uplink signal having a symbol rate according to the modified dual symbol rate standard is only for a packet switched service.

10. The method of claim 1, wherein the uplink signal having a symbol rate according to the modified dual symbol rate standard is for both a circuit switched speech service and for a packet switched data service.

11. The method of claim 1, wherein said communication between the mobile station and the network element is performed within an evolved global system for mobile communications/enhanced data rates for global evolution radio access network.

12. The method of claim 1, wherein said network element is a base transceiver station.

13. The method of claim 1, further comprising:
   receiving by said mobile station a downlink signal with a symbol rate according to said modified symbol rate standard, wherein the symbol rate according to said modified symbol rate exceeds by a further predetermined amount said symbol rate according to said symbol rate standard of 270,833.3 symbols per second of said uplink speech service in said mobile communication system.

14. A computer readable medium having computer program code stored thereon for execution by a computer processor with said computer program code, wherein said computer program code comprises instructions for performing the method of claim 1.

15. An apparatus, comprising:
   an uplink signal generator configured to generate an uplink signal having a symbol rate according to a modified dual symbol rate standard in a service based mobile communication system, wherein the symbol rate according to the modified dual symbol rate standard is smaller than a symbol rate according to a dual symbol rate standard of 541,666.7 symbols per second for providing a smaller bandwidth than when using said dual symbol rate standard, and exceeds by a predetermined amount a symbol rate according to a symbol rate standard of 270,833.3 symbols per second of an uplink speech service in said mobile communication system for providing the same as or a higher number of bits per an original symbol period than said uplink speech service; and
   a transmitter configured to transmit said uplink signal to a network element, wherein said uplink signal has a symbol rate according to said modified dual symbol rate of 325.000 symbols per second wherein said bandwidth at half power substantially equals 325 kHz.

16. The apparatus of claim 15, wherein instead of octonary phase shift keying as used for modulation of said uplink signal according to both said uplink speech service and to said dual symbol rate standard, said uplink signal is modulated using at least one of:
   a quadrature amplitude modulation, and
   a quadrature phase-shift keying modulation.

17. The apparatus of claim 16, wherein said quadrature amplitude modulation has 16 states.

18. The apparatus of claim 16, wherein said uplink signal is modulated with the quadrature amplitude modulation having a bit rate substantially equal to two times of a bit rate of the uplink speech service.

19. The apparatus of claim 16, wherein said uplink signal is modulated with the quadrature phase-shift keying modulation having a bit rate substantially equal to a bit rate of the uplink speech service.

20. The apparatus of claim 16, wherein said signal is modulated using both the quadrature amplitude modulation and the quadrature phase-shift keying modulation.

21. The apparatus of claim 15, wherein said uplink signal has a symbol rate according to said modified dual symbol rate standard of 406,250 symbols per second wherein said bandwidth at half power substantially equals 405 kHz.

22. The apparatus of claim 15, wherein the uplink signal having a symbol rate according to the modified dual symbol rate standard is only for a packet switched service.

23. The apparatus of claim 15, wherein the uplink signal having a symbol rate according to the modified dual symbol rate standard is for both a circuit switched speech service and for a packet switched data service.

24. The apparatus of claim 15, wherein the uplink signal having a symbol rate according to the modified dual symbol rate standard is for a data service.

25. The apparatus of claim 15, wherein said communication between the apparatus and the network element is performed within an evolved global system for mobile communications/enhances data rates for global evolution radio access network.

26. The apparatus of claim 15, wherein said module or a separate receiver comprised in said apparatus is further configured to receive a downlink signal with a symbol rate according to said modified symbol rate standard, wherein the modified symbol rate exceeds by a further predetermined amount said symbol rate of said uplink speech service in said mobile communication system.

27. A mobile communication system, comprising:
a mobile station configured to provide an uplink signal having a symbol rate according to a modified dual symbol rate standard, wherein the symbol rate according to the modified dual symbol rate standard is smaller than a symbol rate according to a dual symbol rate standard of 541,666.7 symbols per second for providing a smaller bandwidth than when using said dual symbol rate standard, and exceeds by a predetermined amount a symbol rate according to a symbol rate standard of an uplink speech service of 270,833.3 symbols per second in said mobile communication system for providing the same as or a higher number of bits per an original symbol period than said uplink speech service; and
a network element configured to receive said uplink, signal, wherein said uplink signal has a symbol rate according to said modified dual symbol rate of 325,600 symbols per second wherein said bandwidth at half power substantially equals 325 kHz.

28. The mobile communication system of claim 27, wherein instead of octonary phase shift keying as used for modulation of said uplink signal according to both said uplink speech service and to said dual symbol rate standard, said uplink signal is modulated using at least one of:
a quadrature amplitude modulation, and
a quadrature phase-shift keying modulation.

29. The mobile communication system of claim 27, wherein the mobile station is a wireless communication device, a portable device, a mobile communication device, a mobile phone or a mobile camera phone.

30. A network element of a mobile communication system, comprising:
a receiver, configured to receive an uplink signal having a symbol rate according to a modified dual symbol rate standard, wherein the symbol rate according to the modified dual symbol rate standard is smaller than a symbol rate according to a dual symbol rate standard of 541,666.7 symbols per second for providing a smaller bandwidth than when using said dual symbol rate standard, and exceeds by a predetermined amount a symbol rate according to a symbol rate standard of 270,833.3 symbols per second of an uplink speech service in said mobile communication system for providing the same as or a higher number of bits per an original symbol period than said uplink speech service; and
a processor configured to transmit said uplink signal further uplink to a further network element, wherein said uplink signal has a symbol rate according to said modified symbol rate standard of 325,000 symbols per second wherein said bandwidth at half power substantially equals 325 kHz.

31. The network element of claim 30, wherein instead of octonary phase shift keying as used for modulation of said uplink signal according to both said uplink speech service and to said dual symbol rate standard, said uplink signal is modulated using at least one of:
a quadrature amplitude modulation, and
a quadrature phase-shift keying modulation.

32. The network element of claim 30, further comprising:
a modified dual symbol rate scheduling module configured to provide an instruction signal to a mobile station for reducing interference in said uplink signal having the symbol rate according to the modified dual symbol rate standard.

33. The network element of claim 30, further comprises:
a transmitter configured to transmit a downlink signal with a symbol rate according to the modified symbol rate standard, wherein the symbol rate according to the modified symbol rate standard exceeds by a further predetermined amount said symbol rate according to said uplink speech service in said mobile communication system.

34. The network element of claim 33, wherein said downlink signal has a symbol rate according to said modified symbol rate standard of 325,000 symbols per second wherein said bandwidth at half power substantially equals 325 kHz.

35. A method, comprising:
receiving by a network element of a service based mobile communication system an uplink signal having a symbol rate according to a modified dual symbol rate standard, wherein the symbol rate according to the modified dual symbol rate standard is smaller than a symbol rate according to a dual symbol rate standard of 541,666.7 symbols per second for providing a smaller bandwidth than when using said symbol rate according to said dual symbol rate standard, and exceeds by a predetermined amount a symbol rate of 270,833.3 symbols per second of an uplink speech service standard in said mobile communication system for providing the same as or a higher number of bits per an original symbol period than said uplink speech service; and
re-transmitting by said network element said uplink signal further uplink to a further network element, wherein said uplink signal has a symbol rate according to said modified dual symbol rate of 325,000 symbols per second wherein said bandwidth at half power substantially equals 325 kHz.

36. The method of claim 35, wherein instead of octonary phase shift keying as used for modulation of said uplink signal according to both said, uplink speech service and to said dual symbol rate standard, said uplink signal is modulated using at least one of:
   a quadrature amplitude modulation, and
   a quadrature phase-shift keying modulation.

37. The method claim 35, further comprising:
   providing an instruction signal by the network element to a mobile station for reducing interference in said uplink signal provided by said mobile station.

38. A computer readable medium embodying computer program code stored thereon for execution by a computer processor with said computer program code, wherein said computer program code comprises instructions for performing the method of claim 35.

39. The network element of claim 30, wherein said uplink signal has a symbol rate according to said modified dual symbol rate standard of 406,250 symbols per second wherein said bandwidth at half power substantially equals 405 kHz.

40. The method of claim 35, said uplink signal has a symbol rate according to said modified dual symbol rate standard of 406,250 symbols per second wherein said bandwidth at half power substantially equals 405 kHz.

* * * * *